March 6, 1962  F. T. GEYLING  3,023,627
STRAIN GAUGES AND ACCELEROMETERS
Filed April 25, 1960  3 Sheets-Sheet 1
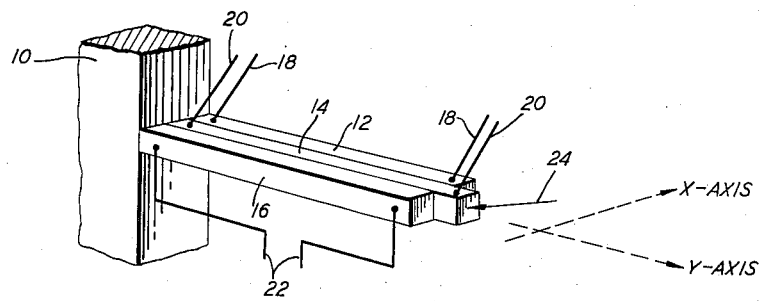
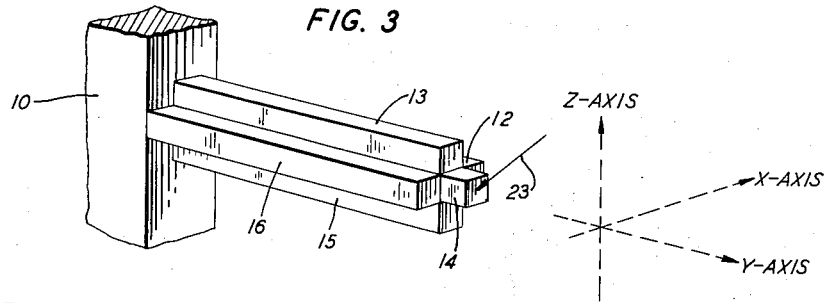
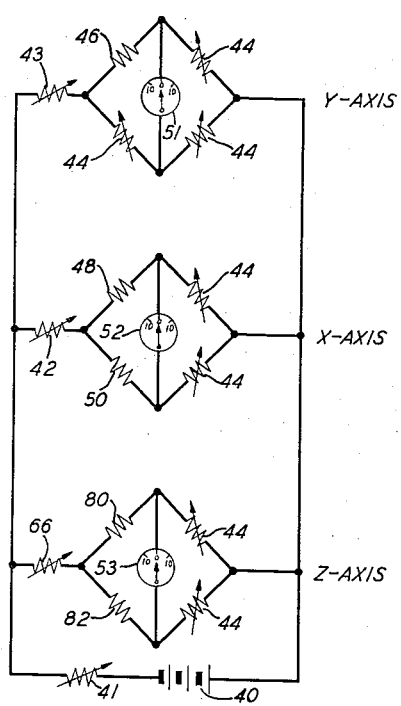
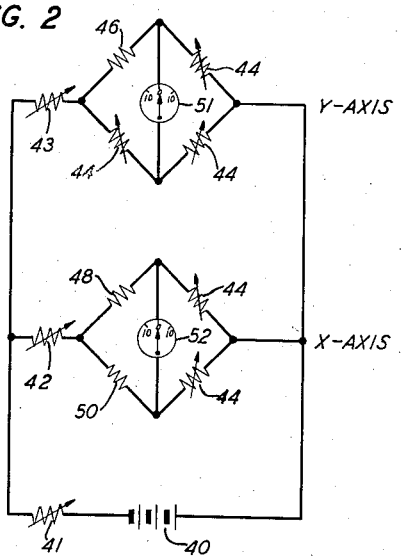
INVENTOR
F.T. GEYLING
BY
H. D. Wright
ATTORNEY March 6, 1962 — F. T. GEYLING — 3,023,627
STRAIN GAUGES AND ACCELEROMETERS
Filed April 25, 1960 — 3 Sheets-Sheet 2
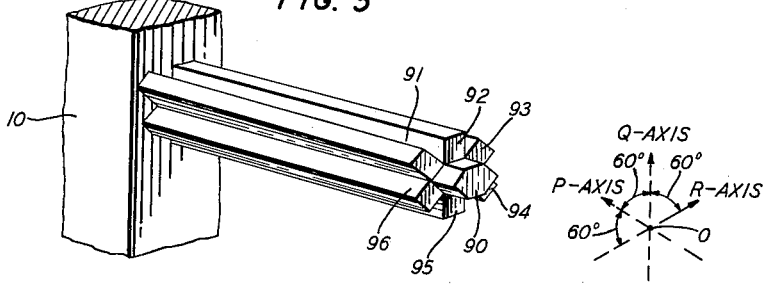
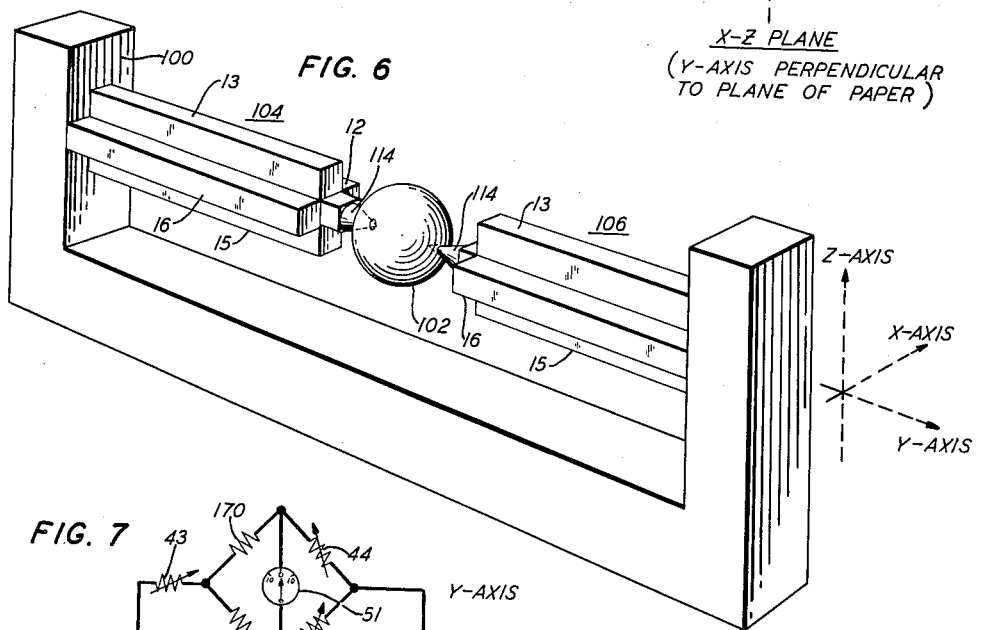
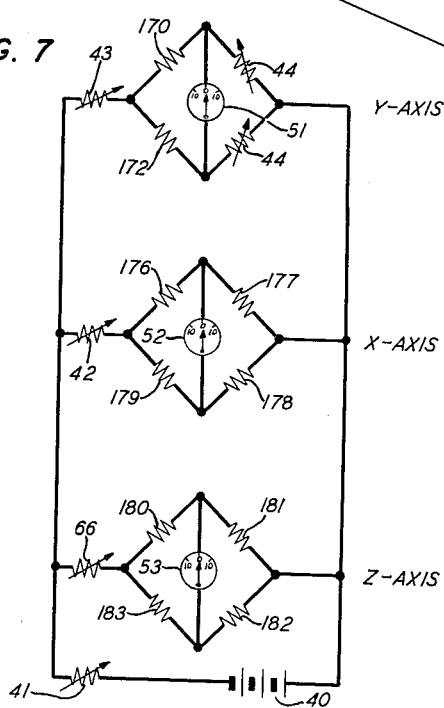
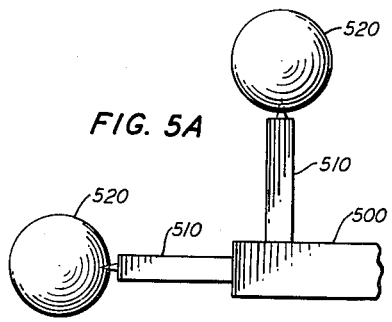
INVENTOR
F.T. GEYLING
BY H. O. Wright
ATTORNEY March 6, 1962     F. T. GEYLING     3,023,627
STRAIN GAUGES AND ACCELEROMETERS Filed April 25, 1960                            3 Sheets-Sheet 3

REVERSING SWITCH POSITIONS

1. *TO LEFT* - LINEAR ACCELERATION ALONG X-AXIS

2. *TO RIGHT* - ROTATORY ACCELERATION IN X-Y PLANE

ROTATORY ACCELERATION
IN Y-Z PLANE OR X-Z PLANE

ROTATORY ACCELERATION
IN X-Y PLANE

CONNECT IN PARALLEL
WITH BRIDGE CIRCUITS
OF FIG. 7

INVENTOR
F.T. GEYLING
BY
H. O. Wright
ATTORNEY

United States Patent Office 3,023,627
Patented Mar. 6, 1962

3,023,627
STRAIN GAUGES AND ACCELEROMETERS
Franz T. Geyling, Summit, N.J., assignor to Bell Telephone Laboratories, Incorporated, New York, N.Y., a corporation of New York
Filed Apr. 25, 1960, Ser. No. 24,403
11 Claims. (Cl. 73—517)

This invention relates to strain gauges, accelerometers and the like. More particularly, it relates to strain gauges, accelerometers and the like which employ members of piezoresistive material.

A companion application of J. S. Courtney-Pratt, Serial No. 24,404, assigned to applicant's assignee, was filed concurrently, on April 25, 1960, with the present application and is directed to specifically differing types of strain gauges, accelerometers and the like.

Prior art devices of the above-indicated types have usually required complex structures which are difficult to manufacture and which often prove difficult to maintain in adjustment.

Accordingly, a principal object of the invention is to simplify the construction and maintenance problems in connection with strain gauges, accelerometers and the like.

A further object is to increase the information afforded by strain gauges, accelerometers and the like.

The above and other objects of the invention are achieved by employing assemblies which include one or more arms which in a typical case may be aligned in parallel relation to a common longitudinal axis, each arm having a plurality of component parts or members which are of a piezoresistive material.

Piezoresistive materials include numerous materials the electrical resistance of which changes with a change in the magnitude and/or direction of the force applied to the material. The changes in resistance are usually at least approximately proportional to the changes in magnitude of the applied force and are ordinarily reversed in direction if the member is subjected to tension rather than to compression.

For example, the resistance of certain piezoresistive materials increases when they are subjected to tension and decreases when they are subjected to compression while for other piezoresistive materials the resistance of the materials increases when they are subjected to compression and decreases when they are subjected to tension.

For a number of piezoresistive materials the orientation with which a member is cut from a single crystal of the material will determine whether its resistance increases or decreases with tension and decreases or increases with compression, respectively.

The relative changes in resistance of the several members of the composite arm, or arms, of the assembly are utilized in associated electrical circuits to provide indications from which the magnitude and direction of the force applied to the assembly can be deduced.

The above and other features, objects and advantages of the invention will become apparent from a perusal of the following detailed description of illustrative embodiments of the principles of the invention, as well as from the appended claims.

In the accompanying drawing:

FIG. 1 illustrates the mechanical features of an arrangement of the invention;

FIG. 2 is an electrical schematic diagram of a circuit including the resistances of the piezoresistive members of the structure of FIG. 1;

FIG. 3 illustrates the mechanical features of a more elaborate arrangement of the invention;

FIG. 4 is an electrical schematic diagram of a circuit including the resistances of the piezoresistive members of the structure of FIG. 3;

FIG. 5 illustrates the mechanical features of a still more elaborate arrangement of the invention;

FIG. 5A illustrates the mechanical features of a specialized arrangement for utilizing devices of the invention;

FIG. 6 illustrates the mechanical features of a further arrangement of the invention;

FIG. 7 is an electrical schematic diagram of a circuit including the resistances of the piezoresistive members of the structure of FIG. 6;

Figure 8:
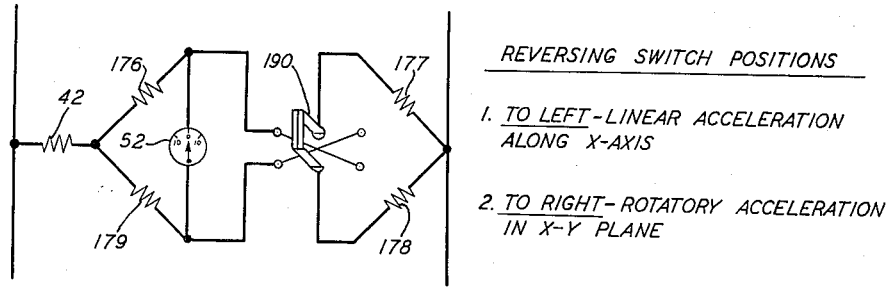
FIG. 8 is an electrical schematic diagram of a circuit which illustrates how the circuit of FIG. 7 can be modified so that the structure of FIG. 6 can provide two differing types of indications.

Throughout the several figures of the drawing identical components are given the same designation numbers, respectively.

In more detail in FIG. 1, a compound arm comprising the three elongated piezoresistive members 12, 14 and 16 is illustrated. These latter members may be of any material having the property of varying in resistance in a manner substantially proportional to the magnitude of the stress which may be imposed upon them.

For example, the three members can be of a material such as silicon or germanium or any of a number of other semiconductive materials and each member can have an electrical resistance which increases with tensile stress and decreases with compressive stress, or vice versa, substantially in proportion to the stress.

For reasons of convenience which will presently become apparent, members 12 and 16 should preferably be mechanically and electrically identical. Member 14 can conveniently be somewhat longer than members 12 and 16 so that forces may be applied to it, though this is, as will presently become obvious, also mainly a matter of convenience.

Rigid support 10 firmly holds the left ends of members 12, 14 and 16, the members being electrically insulated from each other and firmly held together mechanically and being mechanically fastened to support 10 by a strong adhesive material such as an epoxy resin cement, which is also a good electrical insulating material.

Electrical leads 18 are connected to the opposite ends of members 12, leads 20 to the opposite ends of member 14 and leads 22 to the opposite ends of member 16, as shown, so that the members can be electrically connected into electrical circuits in which their resistance variations with variations of the force to which they are subjected can cause electrical variations indicative of the stresses to which they are instantly being subjected.

Arrow 24 represents a force applied to the free end of member 14, the force lying in the plane which includes the longitudinal axes of the members 12, 14 and 16. The arrows to the right in FIG. 1 designated "Y-axis" and "X-axis" indicate the direction of the longitudinal axes of the members 12, 14 and 16 and the direction at right angles to the first mentioned direction in the plane including the axes of the members, respectively.

Referring to the electrical schematic diagram of FIG. 2, assuming that force 24 of FIG. 1 is zero and that in FIG. 2 resistor 46 represents the resistance of member 14 of FIG. 1 and resistors 48 and 50 represent the resistances of members 12 and 16 of FIG. 1, respectively, two Wheatstone bridge circuits, designated "Y-axis" and "X-axis," respectively, are completed by adding five potentiometers 44, connected as shown. Power from a source 40 supplied through control potentiometers 41, 42 and 43 is then applied to the bridge circuits, as shown, and the bridge circuits are each balanced by adjustment of their respective potentiometers 44 until both of the meters 51 and 52 read zero.

If a discrete force such as is represented by the arrow 24 of FIG. 1 is then applied to the right end of member 14, which force has a component parallel to the longitudinal axis of member 14, that is parallel to the Y-axis, as indicated at the right in FIG. 1, the resistance of the member 14, represented by resistor 46 of FIG. 2, will change its magnitude in proportion to the force component acting along its axis and will increase or decrease depending upon the direction of this force component (that is, whether it compresses or stretches the member). A reading will appear on meter 51 which will be proportional to the bridge unbalance caused by the change in resistance of resistor 46. The direction in which the meter is deflected will indicate whether the force compresses or stretches the member 14.

While a force component parallel to the longitudinal axes of members 12 and 16 (Y-axis at right of FIG. 1) will cause their respective resistances to change in proportion to the magnitude of the component, since they are, as noted above, substantially identical their respective resistances, represented by resistances 48 and 50 of FIG. 2, will change by the same amount and no unbalance of their associated bridge circuit of FIG. 2 will result.

However, if the applied force 24 of FIG. 1 has a component parallel to the X-axis, the compound element will tend to bend and, as for numerous so-called "bimorph" elements well known to those skilled in the art, one of the two members 12, 16 will thereby be placed under tension and the other under compression. The net result then is that the resistance of one member will increase and that of the other will decrease. In other words, of the resistances 48 and 50 of FIG. 2 one will increase and the other will decrease thus unbalancing their associated bridge circuit and producing a reading on meter 52 which is proportional to the difference in the resistances which in turn depends upon the magnitude of the force component parallel to the X-axis.

Since member 14 is centrally located in the assembly, substantially one half its cross section will be subjected to tension and the other half to compression and its resistance will, within reasonable limits of force, remain substantially unchanged by the application of the component of the force parallel to the X-axis.

Obviously, a force 24 having a component parallel to the X-axis and also one parallel to the Y-axis of FIG. 1 will cause both bridge circuits of FIG. 2 to become unbalanced by amounts proportional to the respective components. Proper correlation of the information thus afforded will indicate both the magnitude and direction of the applied force in the plane which includes axes X and Y.

Since in general the majority of piezoresistive members will be more sensitive to bending stresses, the circuit of FIG. 2 can be calibrated if desired and control potentiometers 42 and 43 can be adjusted so that meters 51 and 52 will give substantially equal readings when the X-axis and Y-axis components of an applied force are equal. Alternatively, the scales of the meters can be calibrated so that the deflections on one meter, though of substantially different magnitude, can be readily correlated with those on the other meter.

Source 40, as indicated in FIG. 2, is preferably a direct current source and meters 51 and 52 are preferably of the well known "zero-center" type so that possible ambiguity as to the sense of the direction indicated (that is, left or right, et cetera) can be resolved.

In FIG. 3 an arrangement related to that of FIG. 1 is shown and comprises the three members 12, 14 and 16 and the fixed support 10 identical to the correspondingly designated components of the device of FIG. 1, respectively. In FIG. 3, however, additional members 13 and 15 identical to members 12 and 16 are assembled immediately above and below the center member 14. It is to be understood that (as shown in FIG. 1) an electrical connection is made to each end of each of the members (not shown in FIG. 3 to avoid confusing the figure). The members are electrically insulated from each other and mechanically bound together and fastened to rigid supporting member 10 by a strong adhesive which is also a good electrical insulator as stated for the assembly of FIG. 1. With the arrangement of FIG. 3, indications of the magnitude and direction of a component of an applied force 23 parallel to the Z-axis (as indicated at the right in FIG. 3) can be determined, in addition to components parallel to the X and Y axes, as described above for the device of FIG. 1.

The appropriate circuit arrangements for use with the device of FIG. 3 are shown in electrical schematic diagram form in FIG. 4 and differ from those shown in the schematic diagram of FIG. 2 only in the addition of a third bridge circuit (in parallel with the two shown in FIG. 2). The third bridge circuit is designated "Z-axis," for obvious reasons, and resistors 80 and 82 of FIG. 4 represent the resistances of members 13 and 15, respectively, of FIG. 3. The Z-axis bridge circuit will, of course, repsond to any component of the applied force 23 parallel to the Z-axis in precisely the same manner as was described above, in connection with FIG. 1, for an X-axis component and the X-axis bridge circuit. By proper correlation of the information afforded by meters 51, 52 and 53, the magnitude and direction in any plane of a force, such as 23 of FIG. 3, applied to the right end of member 14 can be resolved. The circuit of FIG. 4 is preferably calibrated and control potentiometers 42, 43 and 66 are adjusted to give correlated readings on meters 51, 52 and 53 in one of the manners indicated above in connection with the circuit of FIG. 2 when a force having equal Y-axis, X-axis and Z-axis components is applied to the right end of member 14.

A more precise determination of the direction and magnitude of force components in the plane of the X and Z axes can readily be obtained by adding additional pairs of side members to the central member of the composite arm in the general manner illustrated, for example, by the showing of FIG. 5.

In FIG. 5 the central member 90 is of hexagonal cross section and three pairs of oppositely disposed side members 91, 94; 92, 95 and 93, 96, respectively, are fastened to the central member, as shown. Obviously, the proposed arrangement is equivalent to establishing three lateral axes, successive axes being at an angle of 60 degrees with respect to each other in the X—Z plane, the axes being, for example, designated P-axis, Q-axis and R-axis, respectively, as indicated by the correspondingly designated arrows to the right in FIG. 5 in place of the two orthogonally related lateral axes designated Z-axis and X-axis as in FIG. 3. The Y-axis is perpendicular to the plane of the drawing in which the three above-mentioned P, Q and R axes are shown in FIG. 5. The Y-axis is, of course, retained and as for the previously described assemblies is parallel to the longitudinal axes of the above-mentioned members of the assembly of FIG. 5.

An advantage is that with such a system of three lateral axes, components of a given force only 60 degrees apart can be determined and therefore many angular directions and component magnitudes can be more precisely determined than by reference to axes spaced 90 degrees apart. This is apparent since the transducer now has one more "bimorph" pair of members than is absolutely necessary thus enabling one to make checks between readings on the P versus Q, Q versus R and R versus P axes.

It is further apparent that an octagonal or even a decagonal arrangement can be readily devised where a high degree of resolution of the angle in the X—Z plane is desired. In any such system the electrical schematic diagram of the arrangement and its associated circuits will clearly be that of FIG. 4 with an additional bridge circuit added in parallel with the original bridge circuits of FIG. 4 for each of the additional pairs of side members that are added around the central element. The associated bridge circuits should, of course, be appropriately redesignated.

It is apparent that the arrangements such as those indicated in FIGS. 1, 3 and 5 with their respective circuits, as described in detail above, can be employed not only to measure forces and their directions but also as strain and displacement gauges by fastening the rigid support 10 to one point on an assembly in which strain and displacement are to be investigated and connecting the free or right end of member 14 (or 90 for FIG. 5) to a second point along the assembly.

It should be particularly noted that the strain and displacement gauges of the invention as described above will indicate strain direction as well as strain amplitude and thus will, for example, detect any tendency toward bending, warping or buckling under strain of the assembly between the points of attachment as well as indicating the magnitude of the strain between these points.

In FIG. 5A the mechanical features of an arrangement of the invention which can be employed as an accelerometer are illustrated. When so employed, fixed support 500 is attached to the vehicle the acceleration of which is to be determined. Arms 510 are composite arms which can take any of the forms shown in FIGS. 1, 3 or 5, and described in detail above, though obviously that of FIG. 5 will provide more accurate directional indications in the plane normal to the longitudinal axis of each of the respective arms 510. A mass 520 which can conveniently be spherical is attached to the outer end of each of the arms 510, as shown. The inertial forces of the masses 520 will, of course, then subject the arms 510 to stresses causing changes in the resistances of the elements of arms 510, which in turn can cause associated bridge circuits to become unbalanced and thus provide indications of the magnitude and direction of the acceleration. Two combinations of an arm 510 and a sphere 520 are shown in FIG. 5A with the arms 510 at right angles to each other so that each arm will furnish the increased accuracy of directional indication afforded by the arm of FIG. 5 in its X—Z plane for the X—Y plane of the other arm. Obviously, either combination of arm and mass will by itself provide complete information if its somewhat less accurate X—Y plane indications are acceptable.

A still further use of the structure shown in FIG. 5A is that of a wind direction and intensity indicator. For such use, spheres 520 should preferably have a large diameter and surface area but may be of minimum mass consistent with adequate mechanical strength and rigidity. For example, they could be hollow, reinforced spheres of aluminum or spheres of balsa wood, or the like.

A more complex and for some purposes a more accurate type of accelerometer is illustrated in FIG. 6. It comprises a rigid supporting U-shaped frame 100 which serves to hold the outer ends of the two identical composite arms 104 and 106, respectively, as shown.

Each of the composite arms 104, 106, can, by way of specific example, be substantially identical with the composite arm illustrated in FIG. 3 and described in detail above, except that the inner ends of the central members 114 of the arms of FIG. 6 are brought to points.

A mass 102, having indentations or sockets into which the pointed ends of members 114 fit is supported by members 114, as shown. Mass 102 can, of course, be equipped with jeweled sockets or sockets of hardened steel or the like. The points on members 114 can be of similar materials to decrease friction and wear. The pairs of members 12, 16 and 13, 15 are as described in connection with FIG. 3 and the five members of each composite arm are mechanically bound firmly together and to supporting frame 100 by a strong adhesive, as described for FIG. 3, the adhesive having good electrical insulating properties, so that all members are electrically insulated from each other and from frame 100. Mass 102 is preferably made of electrically nonconductive material or, alternatively, it can be provided with electrically insulated or nonconductive socket members to accommodate the pointed ends of members 114.

Electrically conductive leads are attached at or near each end of each of the five members of both composite arms so that they can be connected severally into the appropriate positions in the associated electrical circuit shown in electrical schematic diagram form in FIG. 7. These leads are not shown in FIG. 6 in order to avoid an unnecessary confusion of lines in the figure.

From inspection it is apparent that the circuit of FIG. 7 has much in common with that of FIG. 4 (employed with the device of FIG. 3) described in detail above. Units having like designation numbers respectively in the two figures are, of course, alike and can be as described for FIG. 3.

However, since the arrangement of FIG. 6 has two composite arms (instead of only one as for FIG. 3) the uppermost bridge circuit employs only two potentiometers 44, the resistors 170 and 172 in the other two arms representing the resistances of the two central members 114 of the arms 104, 106, respectively, of FIG. 6.

Similarly, in the middle bridge circuit, resistors 176 and 177 can represent the resistances of members 12 and 16, respectively, of composite arm 104 while resistors 178 and 179 can represent the resistances of the corresponding members, that is, 12 and 16, respectively, of composite arm 106.

In like fashion, in the lower bridge circuit, resistors 180 and 181 represent the resistances of members 13 and 15, respectively, of arm 104 while resistors 182 and 183 represent the resistances of members 13 and 15, respectively, of arm 106.

The three bridge circuits shown in the schematic diagram of FIG. 7 are, of course, balanced with the accelerometer at rest. Members 12, 13, 15 and 16 of both arms are all identical and are carefully adjusted to have identical resistances. The two members 114 of the two respective arms are likewise carefully adjusted to have identical resistances. If necessary, in order to effect a precise balance, a small potentiometer (not shown) can be added, of course, in series in one or several of the arms of each bridge circuit for the X-axis and Z-axis circuits.

Referring to FIG. 6, acceleration toward the right and parallel with the Y-axis will place arm 106 under tension and arm 104 under compression. Thus member 114 of arm 106 will change its resistance in one direction (increasing or decreasing depending upon the characteristics of the member and the material) and member 114 of arm 104 will change its resistance in the opposite direction, thus unbalancing the uppermost bridge circuit of FIG. 7 and producing a reading on meter 51 proportional to the acceleration.

While members 12, 13, 15 and 16 of arm 106 will also be placed under tension and the corresponding members of arm 104 will also be placed under compression, each oppositely disposed pair of side members will vary in the same way so that their respective associated bridge circuits will remain balanced and meters 52 and 53 will produce no readings.

Acceleration parallel to the X-axis, or to the Z-axis, will obviously affect members 114 of both arms 104 and 106 in the same way so that the uppermost bridge circuit of FIG. 7 will remain balanced and meter 51 will produce no reading.

Acceleration parallel to the X-axis will likewise affect members 13 and 15 of both arms in the same way so that the lower bridge circuit of FIG. 7 will produce no reading. However, this acceleration will produce tension in one of the members 12 or 16 and compression in the other so that the middle bridge circuit will be unbalanced and meter 52 will produce a reading proportional to the acceleration.

Finally, acceleration parallel to the Z-axis will not unbalance the uppermost and the middle bridge circuits of FIG. 7 but will unbalance the lower bridge circuit and produce a reading on meter 53 proportional to the magnitude of the acceleration.

Obviously, acceleration at such an angle that it has components parallel to two or more of the axes will cause the associated bridge circuits to become unbalanced and the meters of the circuits to produce readings proportional to the magnitudes of their respective components. If, as suggested hereinabove, source 40 is a direct current source and the meters are of the zero-center type, the "sense" of the acceleration (that is, for example, right or left on the Y-axis, FIG. 6) will be indicated by the direction in which the meter is deflected. The two or three components of the acceleration as indicated on the meters can then be "resolved" to obtain the amplitude and angle of the acceleration in accordance with any of the several procedures well known and extensively used by those skilled in the art to solve this type of problem.

The circuit of FIG. 7 can be calibrated by adjustment of potentiometers 42, 43 and 66 so that equal readings are obtained on meters 51, 52 and 53 for equal components of acceleration parallel to the Y-axis, X-axis and Z-axis, respectively. Alternatively, the meter scales can be calibrated and correlated as described hereinabove.

From the above it is apparent that the arrangement illustrated by FIGS. 6 and 7 will indicate the magnitude and directional angle of linear acceleration in any direction. However, if the device is subjected to rotatory or torsional acceleration, for specific example, if it is given a counterclockwise rotatory acceleration in the plane of the X and Y axes, arm 106 will be flexed forwardly and arm 104 will be flexed backwardly from the plane of the paper (FIG. 6) and from inspection of FIG. 7 it is apparent that the X-axis bridge circuit will not be unbalanced and of course neither will the other two bridge circuits. The circuit of FIG. 7 will not therefore indicate rotatory or torsional acceleration.

In FIG. 8 the middle (X-axis) bridge circuit of FIG. 7 has been modified by adding a reversing switch 190 electrically connected so that it will, when thrown to the right, interchange the respective positions in the circuit of resistances 177 and 178 and the circuit will then remain balanced for linear acceleration but become unbalanced by rotatory acceleration in the X—Y plane and meter 52 will then produce a reading proportional to the rotatory or torsional acceleration in that plane. When switch 190 is thrown to the left the circuit is obviously the same as for the middle bridge circuit of FIG. 7 and will respond to linear acceleration along the X-axis but will remain balanced for rotatory acceleration.

Reversing switch 190 can be manually operated or it can be automatically operated in accordance with a regular program to sample the indications, if any, obtainable for the two circuit conditions, respectively. In the latter case, an additional switch (not shown) should preferably be provided to substitute a second meter for meter 52 when rotatory indications are being obtained so that linear and rotatory acceleration readings will not conflict. Alternatively, electronic switching circuits can readily be devised by those skilled in the art to provide two independent readings, one of linear acceleration and the other of rotatory acceleration.

By equipping the Z-axis bridge circuit in the same manner, that is with a reversing switch as illustrated for the X-axis bridge in FIG. 8, the Z-axis bridge can respond to indicate the magnitude of rotatory or torsional acceleration in the Y—Z plane. Rotatory acceleration in the X—Z plane can be obtained by the Z-axis bridge circuit if the assembly of FIG. 6 is rotated 90 degrees in the X—Y plane, that is, so that the longitudinal axes of its members are initially parallel to the arrow designated X-axis to the right in FIG. 6. Alternatively, a second assembly as illustrated in FIG. 6 but placed at right angles in the X—Y plane can be employed to provide indications of rotatory acceleration in the X—Z plane. This second assembly could obviously omit members 12 and 16 of both arms and their associated circuits as well as the circuit associated with the central members 114. As a further alternative, where two complete assemblies making an angle of 90 degrees with each other are employed, the readings of one can supplement those of the other, the more accurate readings of the two being selected in the correlation of all readings obtained.

The arrangement illustrated by FIGS. 6 and 7 as described in detail above can be modified to provide either linear or rotatory acceleration indications, or both, as described above, by providing two like members in place of each of the four side members 12, 13, 15 and 16, in each of the arms 104 and 106 of FIG. 6 and adding appropriate additional indicating bridge circuits. This modified form for the arms 104, 106 is shown in FIG. 9 and comprises, grouped around the central member 114, an inner set of four side members 212', 213', 215' and 216' and an outer set of four side members 222, 223, 225 and 226, arranged as shown.

Figure 9:
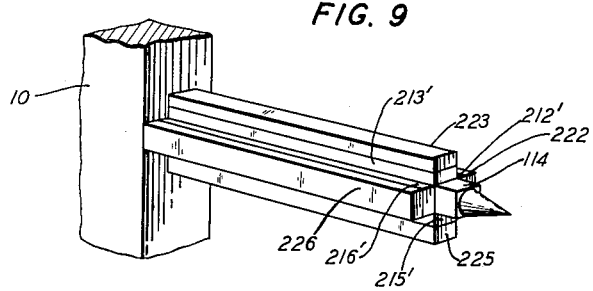
FIG. 9 illustrates the mechanical features of a still further arrangement of the invention.

In the assembly of FIG. 9 all members are electrically insulated from each other and firmly bound mechanically into an integral assembly and to rigid support 10 by use of a strongly adhesive material of good electrical insulating properties as described for FIG. 1 and each of the members is provided with an electrically conductive lead (not shown) connecting to the member at each of its ends.

Figure 10:
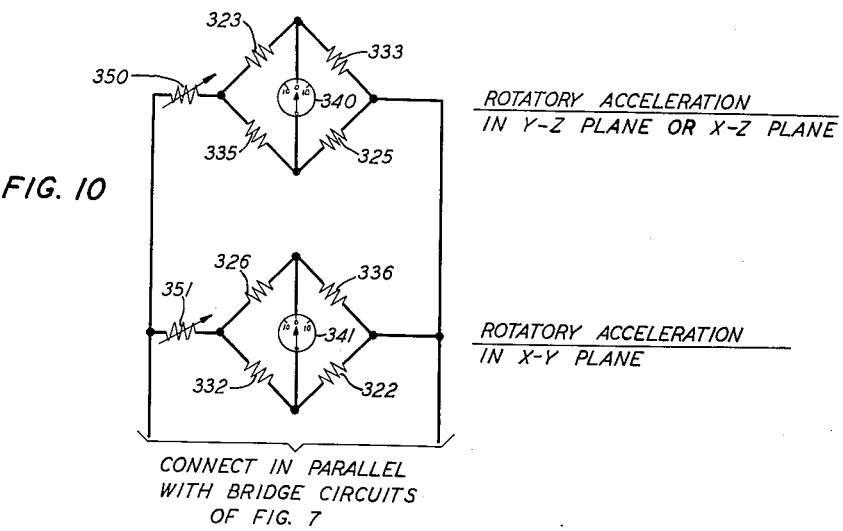
FIG. 10 is an electrical schematic diagram of an addition to the circuit illustrated in FIG. 7 by means of which full advantage may be taken of the capabilities of the structure illustrated in FIG. 9.

By substituting an arm as illustrated in FIG. 9 for each of the arms 104, 106 of FIG. 6, the modified structure can then employ an electrical circuit as shown in FIG. 7 wherein members 212', 213', 215' and 216' are connected as described for members 212, 213, 215 and 216, respectively, of the unmodified structure of FIG. 6 but the added members 222, 223, 225 and 226 of each of the two arms are connected in two additional bridge circuits as indicated in FIG. 10 to provide rotatory or torsional acceleration indications in the Y—Z, or X—Z and X—Y planes, the added bridge circuits being connected in parallel with the original three bridge circuits of FIG. 7, as indicated.

In FIG. 10 potentiometers 350 and 351 serve to control the power supplied to their respective bridge circuits and are employed in calibrating the circuit, as previously indicated. In the upper bridge circuit of FIG. 10 resistors 323 and 325 represent the resistances of members 223 and 225, respectively, of the arm of FIG. 9 and 333 and 335 represent the resistances of the corresponding pair of members, respectively, in a second arm of the type shown in FIG. 9 (assuming as stated above that the structure of FIG. 6 is modified by replacing arms 104 and 106 by two identical arms of the type shown in FIG. 9). Meter 340 will then provide readings indicating the rotatory acceleration to which the structure may be subjected in the Y—Z plane (see arrows at right in FIG. 6). Again, rotary acceleration in the X—Z plane can be obtained by this same circuit if the accelerometer assembly is initially rotated 90 degrees in the X—Y plane or an additional partial assembly can be employed as suggested in connection with FIG. 6 to provide indications of rotatory acceleration in the X—Z plane.

Similarly, in the lower bridge circuit of FIG. 10, resistors 322 and 326 represent the resistances of members 222 and 226, respectively, of the arm of FIG. 9 and resistors 322 and 326 represent the resistances of the corresponding pair of members of the second arm of the type shown in FIG. 9 employed to modify the structure of FIG. 6 as described hereinabove. Meter 341 will then provide readings indicating the rotatory acceleration to which the structure may be subjected in the X—Y plane (see arrows at right in FIG. 6).

In all of the above-described structures employing composite arms which include a plurality of members, each member is made of a material the resistance of which increases appreciably under tension and decreases appreciably under compression, or vice versa, substantially in proportion to the magnitude of the stress to which it is subjected. While an appreciable number of materials having such properties are well known to those skilled in the art and any of such materials can be employed, elements cut from single crystals of silicon or germanium or any of a number of other semiconductive materials have greater sensitivity and much larger changes of resistance with a given change in stress. Accordingly, each of the members of each arm is preferably cut from a single crystal of silicon or germanium or of any of a number of other suitable semiconductive materials. Preferred orientations of the longitudinal axis of each member with respect to the crystallographic axes of the single crystal from which it is cut are given, for example, in the copending joint application of J. S. Courtney-Pratt and W. P. Mason, Serial No. 794,173, filed February 18, 1959, and assigned to applicant's assignee. This joint application of Courtney-Pratt and Mason matured into Patent 2,963,911 granted December 13, 1960.

The conductive leads connecting to each end of each of the members of each arm, as described at numerous points hereinabove, are preferably bonded to the member by thermocompression bonding in accordance with the teachings of the copending joint application of O. L. Anderson and H. Christensen, Serial No. 619,639 filed October 31, 1956, or by twist compression bonding in accordance with the teachings of the copending joint application of O. L. Anderson, P. Andreatch and H. Christensen, Serial No. 647,886 filed March 22, 1957, both of which joint applications are assigned to applicant's assignee.

Circuits similar to those described hereinabove but employing automatic switching arrangements whereby the circuit will automatically accommodate itself to provide readings of either linear or rotatory or torsional acceleration are shown and described in detail for example in the copending application of J. S. Courtney-Pratt mentioned hereinabove, which is being filed concurrently with the present application. It is apparent that the circuits of the present application can be readily modified to incorporate automatic switching features of the general type disclosed in the Courtney-Pratt application.

Numerous and varied other arrangements and modifications of the arrangements described hereinabove can readily be devised by those skilled in the art without departing from the spirit and scope of the principles of the present invention. The above-described arrangements are illustrative of the application of the principles of the invention and the invention is clearly not limited to the specific forms utilized for purposes of illustration. For example, in any of the arrangements described hereinabove, it is apparent that the central member could be dispensed with at the price of introducing a more complex electrical switching arrangement which would, in effect, alternately switch one or more of the other members between its normal position in the associated electrical circuit, as described above, and the position in the electrical circuit normally assigned to the central member.

What is claimed is:

1. An arrangement for indicating the magnitude and direction of an applied force comprising a rigid supporting means, three elongated members of piezoresistive material mechanically bound with their longitudinal axes parallel to each other into a unitary assembly by intervening layers of a strong, electrically nonconducting adhesive, one end of the assembly being firmly bound to the rigid supporting means by the nonconducting adhesive, a first electrical circuit electrically connecting to a first of the members and adapted to indicate the magnitude and direction of changes in the resistance of the member, and a second electrical circuit electrically connecting to the two other members and adapted to indicate the magnitude and direction of changes between the resistances of the two other members, whereby when the force to be measured is applied to the free end of the assembly the indications resulting from the change in resistance of the first of the members and the change between the resistances of the two other members can be resolved to obtain an indication of the magnitude and direction of the applied force.

2. An arrangement for indicating the magnitude and direction of a force comprising an assembly of members which includes an elongated central member and a plurality of pairs of elongated members of piezoresistive material, the members of each pair being positioned on opposite sides of the central member and being bound to the central member by a strong, electrically nonconducting adhesive, the longitudinal axes of each pair being in a common plane which includes the longitudinal axis of the central member, the several planes includes the axes of the several pairs of members intersecting at discrete known angles, the longitudinal axes of all the members being parallel to each other, means for rigidly supporting one end of the assembly of members, an electrical circuit connecting to the central member and adapted to indicate the direction and magnitude of changes in the resistance of the central member and a plurality of individual electrical circuits, a different one of said circuits connecting to each of the pairs of members, respectively, and adapted to indicate the direction and magnitude of changes between the resistances of the members of its associated pair, whereby when the force to be measured is applied to the free end of the central member the change in resistance of the central member and the changes between the resistances of the members of each pair will provide information which can be resolved to indicate the magnitude and direction of the applied force.

3. An arrangement for indicating the magnitude and direction of strain between two points of a structural element resulting from the application of stress to the structural element, comprising a first elongated member of piezoresistive material, an electrical circuit connecting to the member and adapted to indicate changes in the resistance of the member, a pair of elongated members of piezoresistive material electrically insulated from the first member and from each other and mechanically bound into a unitary assembly with the first member, the longitudinal axes of all the members being parallel to each other, an electrical circuit connecting to the pair of members and adapted to indicate changes between the resistances of the pair of members, and means for rigidly attaching one end of the assembly of members to a first of the two points and the opposite end to the other point, whereby the change in the resistance of the first member and the change between the resistances of the pair of members resulting from application of the stress to the structural element will indicate the magnitude and direction of the resulting strain.

4. An accelerometer comprising the arrangement of claim 1 and a mass rigidly attached to the free end of the assembly of members.

5. An accelerometer comprising the arrangement of claim 2 and a mass rigidly attached to the free end of the central element.

6. An accelerometer comprising a mass, a pair of elongated arms, the mass being supported by and between end surfaces of the pair of arms, the arms extending at substantially opposite directions from the mass, each arm being rigidly supported at the end opposite that in contact with the mass, each arm comprising a plurality of elongated members of a piezoresistive material, the plurality of members including in each arm a central member and a pair of members electrically insulated from the central member and from each other and mechanically bound into a unitary assembly with the central member, the individual members of the pair in one arm corresponding in position relative to their associated central member with the individual members of the pair in the other arm, respectively, an electrical circuit connecting to the central members of both arms and adapted to indicate changes between the resistances of the central members and an electrical circuit connecting to the pairs of members of both arms and adapted to indicate changes in the combined resistances of a member of one pair and the corresponding member of the other pair with respect to the combined resistances of the other member of the one pair and the other member of the other pair, whereby linear acceleration of the over-all assembly will produce indications in the electrical circuits from which the magnitude and direction of the acceleration can be determined.

7. An accelerometer comprising a mass, a pair of elongated arms, the mass being supported by and between end surfaces of the pair of arms, the arms extending at substantially opposite directions from the mass, each arm being rigidly supported at the end opposite that in contact with the mass, each arm comprising a plurality of elongated members of a piezoresistive material, the plurality of members including a central member and a pair of members electrically insulated from the central member and from each other and mechanically bound into a unitary assembly with the central member, the individual members of one pair corresponding in position relative to their associated central member with the individual members of the other pair, respectively, an electrical circuit connecting to the central members of both arms and adapted to indicate changes between the resistances of the central members and an electrical circuit connecting to the pairs of members of both arms and adapted to indicate changes in the combined resistances of a member of one pair and the non-corresponding member of the other pair with respect to the combined resistances of the other member of the one pair and the other member of the other pair, whereby rotatory acceleration of the assembly in a plane parallel to the plane which includes the longitudinal axes of all the members will produce indications in the electrical circuits from which the magnitude and direction of the rotatory acceleration can be determined.

8. An accelerometer comprising a mass, a pair of arms supporting the mass between their ends, the arms extending in substantially opposite directions from the mass, a rigid frame, the far ends of the arms being rigidly held by the frame, each arm comprising a central member and a plurality of pairs of members, the members being of a piezoelectric material, the members of each arm being electrically insulated from each other and from the mass and the frame, the members of each arm being mechanically bound into a unitary assembly, each pair of members being assembled adjacent the central member with their longitudinal axes parallel to the longitudinal axis of the central member and lying in a common plane with the axis of the central member, the common planes of the plurality of pairs of members having discrete angular relations with respect to each other, each pair of members of one arm being in the same plane with a corresponding pair of members of the other arm, an electrical circuit connecting to the central members of the pair of arms and adapted to indicate changes between the resistances of the two members, a plurality of independent electrical circuits, each circuit electrically connecting to the members of a pair in one arm and the members of the corresponding pair of the other arm and adapted to indicate changes in resistance between the combined resistances of one member of one pair and the corresponding member of its corresponding pair and the combined resistances of the other member of the one pair and the other member of the corresponding pair, whereby linear acceleration of the over-all accelerometer results in a plurality of indications from the plurality of circuits from which the magnitude and direction of the linear acceleration can be determined.

9. The accelerometer of claim 8 in which each electrical circuit connecting to the members of a pair of members of one arm and the members of the corresponding pair of members of the other arm includes means for interchanging the positions of two of the four members in the electrical circuit, whereby rotatory acceleration of the over-all accelerometer results in a plurality of indications from which the magnitude and direction of the rotatory acceleration can be determined.

10. In a system for indicating the magnitude and direction of a force a unitary assembly comprising an odd plurality of elongated piezoresistive members electrically insulated from each other and mechanically bound together with their longitudinal axes parallel to each other, a first electrical circuit electrically connecting to one of the members and adapted to indicate changes in the resistance of the member, a second electrical circuit electrically connecting to two other of the members, one of the two other members being in a position nearer a specific exterior surface of the assembly than the other, the second circuit being adapted to indicate differences between the resistances of the two members, and means for rigidly fixing one end of the assembly whereby when a force is impressed upon the free end of the assembly the magnitude and direction of the force can be determined.

11. A gauge comprising a unitary assembly comprising an odd plurality of elongated piezoresistive members electrically insulated from each other and mechanically bound together with their longitudinal axes parallel to each other, a first electrical circuit electrically connecting to one of the members and adapted to indicate changes in the resistance of the member, the remaining members being associated in pairs, each pair containing one member nearer a specific exterior reference surface of the assembly than the other member of the pair, the specific exterior reference surfaces for the several pairs being at predetermined angular positions around the assembly, and a plurality of electrical circuits, each of said circuits being associated with and electrically connecting to the members of a different pair and adapted to indicate changes between the resistances of the members of that pair.

References Cited in the file of this patent
UNITED STATES PATENTS

| | | |
|---|---|---|
| 2,377,212 | Cottrell | May 29, 1945 |
| 2,728,868 | Peterson | Dec. 27, 1955 |
| 2,775,460 | Shivack | Dec. 25, 1956 |
| 2,905,771 | Burns | Sept. 22, 1959 |
| 2,944,117 | Gray | July 5, 1960 |